US008959121B2

(12) United States Patent
Stine et al.

(10) Patent No.: US 8,959,121 B2
(45) Date of Patent: Feb. 17, 2015

(54) ACCESSIBLE AND UPDATEABLE SERVICE RECORDS

(75) Inventors: Ted Stine, Suwanee, GA (US); Joseph Anthony Speeney, Basking Ridge, NJ (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 37 days.

(21) Appl. No.: 13/307,344

(22) Filed: Nov. 30, 2011

(65) Prior Publication Data

US 2013/0138700 A1 May 30, 2013

(51) Int. Cl.
*G06F 7/00* (2006.01)
*G06F 17/30* (2006.01)
*G06Q 10/00* (2012.01)
*G06Q 30/00* (2012.01)
*G06F 15/16* (2006.01)

(52) U.S. Cl.
CPC ........ *G06F 17/30289* (2013.01); *G06Q 30/016* (2013.01)
USPC .......................................... 707/803; 705/304

(58) Field of Classification Search
CPC ........................ G06Q 30/016; G06F 17/30289

USPC .......................................... 705/304; 707/803
See application file for complete search history.

(56) References Cited

U.S. PATENT DOCUMENTS

| 6,070,001 | A  | * | 5/2000 | Meissner et al. | 709/203 |
| 6,539,386 | B1 | * | 3/2003 | Athavale et al. | 707/999.01 |
| 7,024,423 | B1 | * | 4/2006 | Aboujaoude et al. | 707/999.102 |
| 7,464,092 | B2 | * | 12/2008 | Lee et al. | 707/999.003 |
| 2003/0187876 | A1 | * | 10/2003 | Ohnishi | 707/999.107 |
| 2006/0069577 | A1 | * | 3/2006 | Schmitt et al. | 705/304 |
| 2007/0208605 | A1 | * | 9/2007 | Ambrose et al. | 705/304 |
| 2010/0100809 | A1 | | 4/2010 | Thomas et al. | |
| 2010/0185656 | A1 | * | 7/2010 | Pollard | 707/769 |
| 2011/0320308 | A1 | * | 12/2011 | Dearlove et al. | 705/26.8 |

* cited by examiner

*Primary Examiner* — Greta Robinson
*Assistant Examiner* — Brian E. Weinrich
(74) *Attorney, Agent, or Firm* — Greenblum & Bernstein, P.L.C.

(57) ABSTRACT

A first record of a first component of a service is provided from a memory to a requester of the first component of the service. The first record of the first component of the service is edited using a processor of a computer in accordance with a request from the requester of the first component of the service. A second component of the service is provided in accordance with the edited first record of the first component of the service in the memory.

19 Claims, 6 Drawing Sheets

FIGURE 6

594837
Citizen reports broken street lights

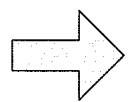

594837
Citizen reports street lights not turned on though its dark (updated)

FIGURE 7

605948
Customer requests expanded basic service

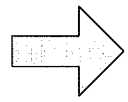

605948
Customer requests advanced service (updated)

Open Checking Acct. O   Open Savings Acct. ■

Open Investment Acct. O   Open IRA Acct. O

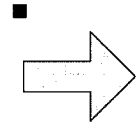

716059

Open Checking Acct. ■   Open Savings Acct. O

Open Investment Acct. O   Open IRA Acct. O

Option 1  O  Option 2  ■

Option 3  O  Option 4  O

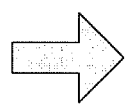

827160

Option 1  ■  Option 2  O

Option 3  O  Option 4  O

ACCESSIBLE AND UPDATEABLE SERVICE RECORDS

BACKGROUND

1. Field of the Disclosure

The present disclosure relates to service records. More particularly, the present disclosure relates to enabling users to access and update service records internal to an entity that provides a communications service.

2. Background Information

Communications services today are provided by human and non-human agents. Records are made of communications between initiating parties and the agents, and services are provided in accordance with the records. For example, non-emergency and emergency government contact centers take reports for assignments to government agencies for follow-up. Additionally, companies take orders and complaints and inquiries for assignments to personnel for follow-up. When a party follows up on an original communication with a new communication to check on status of an earlier communication or to revise a request or report from the earlier communication, the party may initiate the new communication in the same manner and to the same address as the earlier communication.

BRIEF DESCRIPTION OF THE DRAWINGS

FIG. 6 shows an exemplary update for accessible and updateable service records, according to an aspect of the present disclosure;

FIG. 7 shows an exemplary update for accessible and updateable service records, according to an aspect of the present disclosure;

FIG. 8 shows an exemplary update for accessible and updateable service records, according to an aspect of the present disclosure; and FIG. 9 shows an exemplary update for accessible and updateable service records, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

As described herein, parties are provided with the ability to access and update internal communications service records created by agents, and services are provided in accordance with the updated records. Records may initially be created by human or non-human agents that receive initial communications, and parties are provided with an ability to access and update the records. Though the first component of a service as described herein includes communications with an agent, the second component of a service described herein may differ from the first component in many ways. Examples of a second component of a service may include:

providing non-contiguous follow-up communications with the same agent or a different agent providing contiguous or non-contiguous follow-up communications with the same agent or a different agent in a different communications mode than in the initial communications providing contiguous or non-contiguous follow-up communications with the same agent or a different agent over a different communications channel than in the initial communications providing contiguous or non-contiguous follow-up communications with the same agent or a different agent using a different communications device than in the initial communications providing content to a requester over a communications network providing a governmental service to a requester providing a good to a requester As an example, an initial call to a human agent over a telephone network using a SmartPhone may be a first component of a service, and a second component may be when the agent transfers handling of the party that places the call to an automated computerized agent that interactively exchanges chat remarks with the party over the same SmartPhone or a different device. The second chat session may be the second component of the service, and the record of the first component may be provided to the party for review only after the chat session starts.

For contiguous components of a communications service, the provider of the service may not require new user identification and passwords to allow access to the record of the first component during the second component. However, during non-contiguous components of a communications service, a provider may require a password and unique user name from a requester in order to allow access to and editing authority for the requester's record of the first component of the service.

Figure 1:
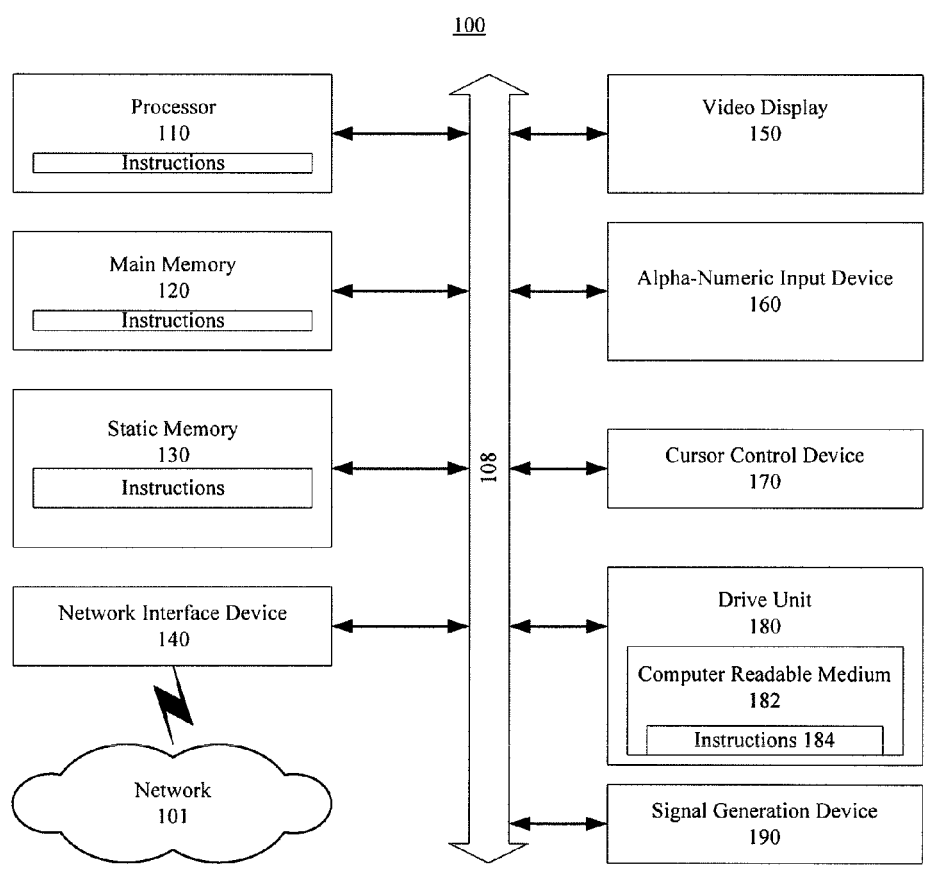
FIG. 1 shows an exemplary general computer system that includes a set of instructions for accessible and updateable service records, according to an aspect of the present disclosure.

FIG. 1 is an illustrative embodiment of a general computer system, on which a method of providing accessible and updateable service records can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a desktop computer, a server computer, a tablet personal computer (PC), a personal digital assistant (PDA), a mobile device, a global positioning satellite (GPS) device, a palmtop computer, a laptop computer, a communications device, a wireless telephone, a control system, a personal trusted device, a web appliance, a web server, a network router, switch or bridge, a user computer or agent computer, a service coordination server, an interactive voice response system computer or other interactive system computer, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
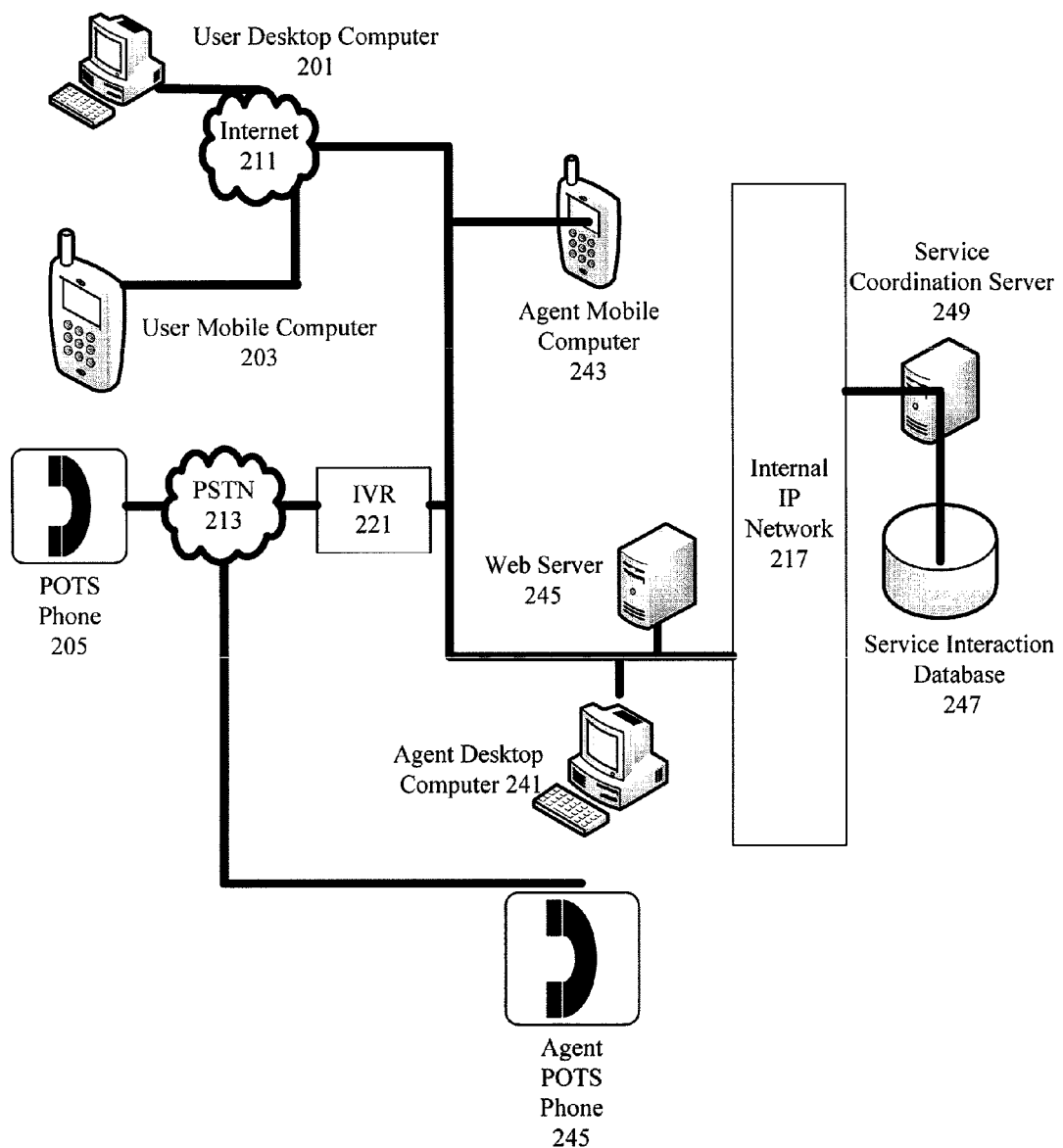
FIG. 2 shows an exemplary network for accessible and updateable service records, according to an aspect of the present disclosure.

FIG. 2 shows an exemplary network for accessible and updateable service records, according to an aspect of the present disclosure. In FIG. 2, the exemplary network includes a service coordination server 249 and a service interaction database 247 to provide accessible and updateable service records. These elements are provided as examples of how to implement centralized coordination for multiple agents and agent systems to commonly generate and store initial records, and then control access to the parties/users/customers/citizens for who the records were initially generated. Records as described herein may include any or all of the following attributes:

- records may be maintained internally by the service provider
- records may be maintained in a cloud-computing network by the service provider
- access to the records may be provided only to authenticated parties by the service provider
- access to the records may be provided only to a party that provides unique identification information provided to the party during the first component/initial communication of the service
- access to the records may be provided only to a party that provides a correct username and password In FIG. 2, user desktop computer 201, user mobile computer 203 and plain old telephone system (POTS) phone 205 are exemplary devices used by parties to contact agents across networks such as the internet 211 and public switched telephone network (PSTN) 213. The parties may be in roles such as user, subscriber, customer, citizen, or any other type of role for which a party contacts agents in a communications network. The parties may have multiple different devices that communicate with agents over multiple different networks using multiple different modes at multiple different times. The records may be accessed and updated between the use of the different devices and different networks in different modes, and between the different times.

Multi-modal communications are communications where information is transported by and/or in multiple modes. Communications modes can be distinguished by the type of information carried in the communications and the manner in which the communications are transmitted. Types of information may include voice, text and graphics. Manners in which communications are transmitted may vary by standards and protocols to which the communications adhere, or by programming languages used to code the information. A communications standard is a definition or format approved by a recognized standards organization, such as the International Telecommunication Union (ITU), the Institute of Electrical and Electronic Engineers (IEEE), the International Telecommunications Union (ITU), and the International Standards Organization (ISO). Exemplary communications standards include G.711, the global system for mobile communications (GSM) standard, the interim standard 95 (IS-95); the code division multiple access (CDMA) 2000 standards, i.e., CDMA2000 1xRTT, CDMA2000 EV-DO, and CDMA2000 EV-DV; digital subscriber line (DSL) standards, fiber channel standards (FCS), and motion picture expert group (MPEG) standards. A communications protocol is the set of standard rules for data representation, signaling, authentication and error detection required to send information over a communications channel. Exemplary communications protocols include point to point protocol (PPP), Internet protocol (IP), transmission control protocol (TCP), and simple mail transfer protocol (SMTP).

Multi-modal communications with agents as described herein enable a user to transition within and between service components in different communications modes using one or more communications devices. The second or later component is provided in accordance with updated records from the first or earlier component.

A channel in communications may be defined by a route through which information is transmitted, a frequency bandwidth in which information is transmitted, a physical link over which information is transmitted, an algorithm by which a signal is transmitted over multiple continuously varying portions of the frequency spectrum (e.g., a spread spectrum), or an address or party at an endpoint of the channel, such that any one channel is discernible. Thus, for example, a channel changes when communications with a requester are switched between agents, even though the requester and the communications mode remain the same. The multi-modal/multi-channel services described in the present disclosure may be components provided as a single, continuous service over multiple channels, where second or later components are provided in accordance with updated records from the first or earlier component.

A user interface is the totality of mechanisms by which a user interacts with a system such as a personal communications device or remote system in communication with the personal communications device. The user interface accepts input to allow the user to manipulate the personal communications device or remote system and provides output to allow the system to produce the effect of the user's manipulation. The user interface allows a user to receive and/or send audible and/or visual information using audible senses, visual senses and/or touch senses.

According to the present disclosure, a user interface includes the arrangement and presentation of audible and/or visual information to remote users. The arrangement and presentation of audible and/or visual information may be prepared in accordance with the needs of a service provider to provide information to or request information from a human or automated agent over the one or more networks using an electronic device. Thus, a user interface in a voice component of a service includes the presentation (e.g., voice and content) of information to be provided to the user, including inquiries to be presented to the user and responses to anticipated inquiries from the user. Additionally, a user interface in email, Internet or chat components of a service includes the presentation (e.g., arrangement and content) of information, including input mechanisms such as graphical data entry windows and checkboxes.

A graphical user interface is a programmed visual representation rendered by a computer program to enable a user to interact with a system such as a personal communications device or remote system in communication with the personal communications device. Well known graphical user interfaces include features such as pointers, icons, a desktop for grouping and arranging icons, windows to divide a screen into areas, and menus. The user manipulates input devices, such as a mouse, keyboard or touch screen to manipulate the features of the graphical user interface to provide and receive information.

The POTS phone 205 communicates over the public switched telephone network (PSTN) with an interactive voice response (IVR) system 221 or with an agent using agent POTS phone 245. The interactive voice response system 221 generates and provides computer records to service interaction database 247 via service coordination computer and across an internal IP network 217. The agent with a POTS phone 245 uses an agent desktop computer 241 to also generate and provide computer records to service interaction database 247 via service coordination server 249 and across an internal IP network 217.

The user desktop computer 201 and user mobile computer 203 are used to communicate over the internet 211 with the interactive voice response system 221 or with an agent using agent mobile computer 243 or with the agent using agent desktop computer 241 or with an interactive agent program on a web server 245. The interactive voice response system 221, agent mobile computer 243, agent desktop computer 241 and web server 245 all provide computer records to service interaction database 247 via service coordination server 249 and across the internal IP network 217.

As described, a single party may use multiple different devices and different networks in different modes, and at different times. For example, a human or automated agent in FIG. 2 may transfer communications to another human or automated agent in a different mode or over a different channel. A party that initiates the first component of the service may also use a multi-modal device such as a computer or SmartPhone, or multiple devices that operate in different modes such as a traditional telephone and a tablet computer that operates over a broadband wireless network. All devices and apparatuses in FIG. 2 are exemplary of the user and agent devices and apparatuses that can be used to generate and provide computer records for storage and follow-up.

Elements of the network shown in FIG. 2 may be elements of a cloud computing network. For example, any or all of interactive voice response system 221, web server 245, service coordination server 249, and service interaction database 247 may be elements provided as third party services for a service provider by a cloud computing network. Storage and editing of service records, as well as automated interactive agent services, may be provided by components of a cloud computing network.

An example of an environment in which accessible and updateable records is used is a governmental 311 non-emergency contact center. In this example, a user with a phone or computer contacts the 311 non-emergency contact center to report a non-emergency problem that falls under the responsibility of the government to address. The non-emergency call center may provide interactive voice response systems, web servers and human agents to generate non-emergency reports. The reports may be automatically routed for assignment to different governmental agencies such as an animal control agency, a forestry agency, an electricity agency, a pothole agency, and a graffiti removal agency. The 311 non-emergency contact center generates and stores the report in a service interaction database. When the user realizes that the report may contain inaccurate information, or if the user simply wishes to review the internal record, the user may initiate a communication to an address provided by the 311 non-emergency contact center during the initial communication and report. The service coordination server 249 retrieves the record for review by the user, and allows the user an opportunity to update the report.

The update may be performed in a mode and over a network different than the mode and network for the initial report. For example, a user may provide an initial report by phone to a human agent that takes notes on a computer. The human agent may provide the user an internet address and unique report identification number to use to review and update the report taken in the first communication. The user may then use a computer or SmartPhone or other device with a web browser to visit the website, and review and update the report. Similarly, an initial report taken from a user over the internet may be updated using a telephone network. In the latter example, the report may be read back to the user by an interactive voice response system or human agent and updated in accordance with instructions of the user.

According to the present disclosure, the user may be provided with an access address and/or unique report identifier. Using the access address and/or unique report identifier, the user can access and update the internal report of the government 311 non-emergency contact center. In this way, misinformation or erroneous information can be corrected, or additional details can be provided, or a report can be cancelled, all without necessarily involving a human agent though a human agent may also be invoked in instances.

Another example of an environment in which accessible and updateable records is provided includes a web server used to take orders for products and/or services. For example, a party may order a new utility service, and initially schedule an appointment for the service. Using an access address and/or unique report identifier provided when scheduling the initial appointment, the user can change the appointment date or time, or change the service order, or correct an address, all without necessarily involving a human agent. As described above, the access to the record may be provided using a different device, network and mode than those by which the appointment was first scheduled.

The systems, servers and computers used by human and non-human agents to take reports are networked across an internal IP network 217 so that different systems, services and computers can commonly provide reports to and access information from the database 247. Using such an internal IP network users may be required to provide authentication information before accessing and/or updating records in the service interaction database 247.

The service coordination server 249 is a computer such as the general computer system 100 shown in FIG. 1. The service coordination server 249 coordinates the storing of records by the various agent systems described herein, and the accessing and updating of such records by the various user systems described herein.

Figure 3:
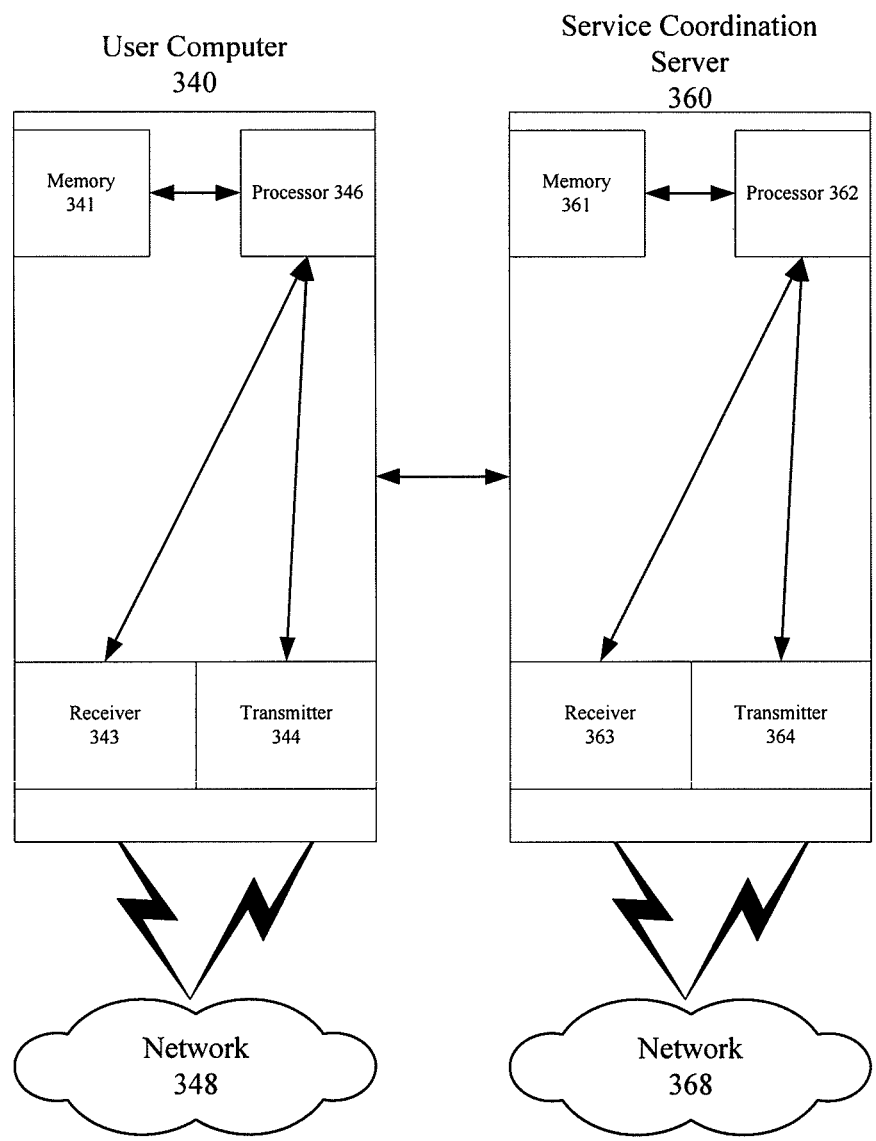
FIG. 3 shows an exemplary user computer and an exemplary service coordination server for accessible and updateable service records, according to an aspect of the present disclosure.

FIG. 3 shows an exemplary user computer and an exemplary service coordination server for accessible and updateable service records, according to an aspect of the present disclosure. FIG. 3 shows an exemplary user computer 340 and an exemplary service coordination server 360 for accessible and updateable service records. In FIG. 3, user computer 340 includes a memory 341, a processor 346, a receiver 343 and a transmitter 344. The receiver 343 and transmitter 344 communicate over network 348. The processor 346 processes instructions and data from the receiver 343 and memory 341, and forwards instructions or data to transmitter 344 for transmission or to memory 341 for storage. In FIG. 3, service coordination server 360 includes a memory 361, a processor 362, a receiver 363 and a transmitter 364. The receiver 363 and transmitter 364 communicate over network 368. The processor 362 processes instructions and data from the receiver 363 and memory 361, and forwards instructions or data to transmitter 364 for transmission or to memory 361 for storage.

The user computer 340 and service coordination server 360 also communicate with each other in the embodiment of FIG. 3. The servers may communicate over a communications network, or may alternatively be implemented on the same physical computer. The service coordination server 360 may coordinate the storage of and access to records, so that a service interaction database 247 in FIG. 2 shares environmental data among more than one interactive system.

Figure 4:
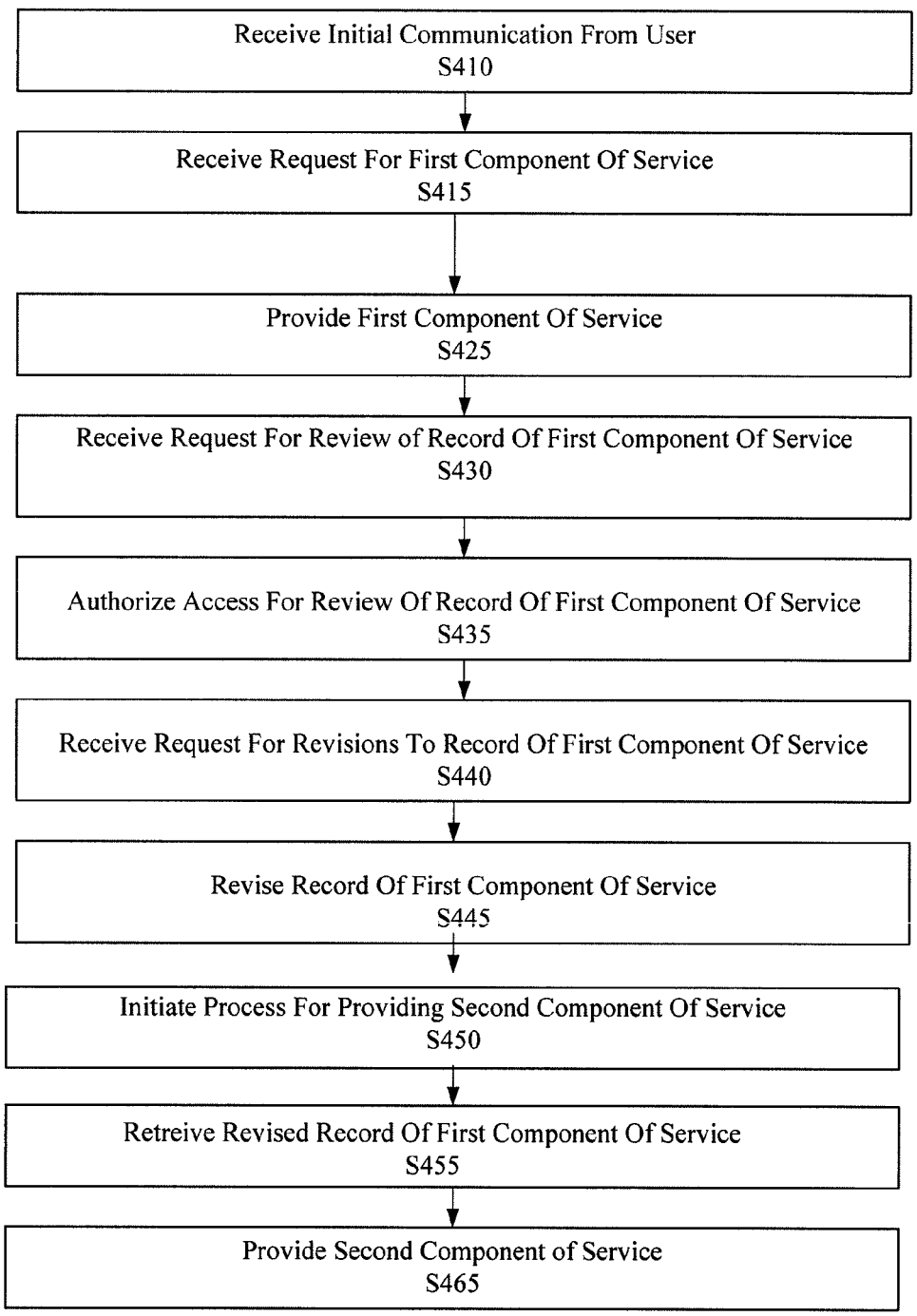
FIG. 4 shows an exemplary process for accessible and updateable service records, according to an aspect of the present disclosure.

FIG. 4 shows an exemplary process for accessible and updateable service records, according to an aspect of the present disclosure. In FIG. 4, an initial communication from a user is received at S410. As described herein, an initial communication may be received over the Internet and/or a phone network, though any communications network may be used for communications between a user and an agent in the manner described herein.

A request for a first component of a service is received at S415. As described herein, a first component of a service may itself be a request for a governmental service, an order for a good or service, an appointment, a complaint, or any other type of communication with an agent for which a follow-up is expected. At S425, the first component of the service is provided. As described herein, the first component of a service may be request or other report being taken for follow-up. The agent may also provide the user with a communications address and/or unique identifier to later access, review and update the record of the first component of the service.

At S430, a request to review the record of the first component of the service is received. Here, the user may re-contact the original communications address for the agent that took the report and provide the unique identifier. Alternatively, the user may contact the communications address provided by the agent that took the report, and then provide the unique identifier is necessary. The user is authorized for access to review the record of the first component of the service at S435.

At S440, a request to revise the record of the first component of the service is received, and at S445 the record of the first component of the service is revised. The request for revisions may be a change to a selection of a choice initially recorded in the first component of the service. The request for revisions may also be an edit to text and/or symbols and/or numbers in a word processing program. The record may reflect the original record and the actual revisions so that the record shows who, when and how the record was revised. The original and revisions may be shown as a "mark-up" to text, or by different colors to the original and revised record details. The request for revisions may also be simply the addition of a comment from the party, including comments that confirm the correctness of the report as originally drafted by the agent.

At S450, the process for initiating a second component of a service is initiated. At S455, the revised record of the first component of the service is retrieved. At S465, the second component is provided in accordance with the revised record of the first component of the service.

A variety of examples of a second component of a service have been described, including the provision of content and goods. However, the second component of a service may be a time shifted, device shifted, mode shifted or channel shifted continuation of the first component of a service. The shift between the first component and second component may be with the original agent or with a new agent that refers to a dialog of the first component created by the initial agent. For example, a customer with a SmartPhone may communicate with an agent over a telephony network until the agent decides that the communication should be shifted to a chat session or email session, or even joint collaboration on a document. The dialog/record of the first component may be provided to the party for review before or during the second component, and the party may edit or update the record of the first component so as to improve the ability of the agent to provide the second component. Where the second component of the service also involves a communication with an agent, a second record of the second component of the service may be stored as another update to the dialog originally generated as the record of the first component of the service. The dialog may be based on a predetermined template of a dialog provided by a communications service provider, such as when interactive service components follow a dialog script in interactively communicating with customers.

A rules engine component of software executed by the interactive voice response system 221 or web server 245 may determine a dialog flow which includes the first component of the service and the second component of the service. The dialog flow may be provided as an application flow of an application provided by the interactive voice response system 221 or web server 245, such as an interactive help application provided by a financial website. As described herein, the second component of such an application is provided in accordance with the edits to the record of the first application by the requesting party. The service transitions from the first component to the second component may be based on the edited first record, such as when content to be provided as the second component is changed based on the edited first record. An application flow manager component of software executed by the interactive voice response system 221 or web server 245 may manage the transition from the first component of the service to the second component of the service. The application flow manager may selectively determine which components of a service to provide as the second components based on the edited record of the first component. For example, a follow-up chat or email to a customer provided as a second component of a service may include content that varies based on the edits and updates to the record of the first component provided by the party.

As another example of accessing and updating communications records described herein, a party with a multi-modal SmartPhone may initiate a call to an agent with multi-modal communications capabilities. The user may request, for example, a catering service from the agent. As with many services requested over a communications network, the request for a catering service may be complex, and the agent may wish for the customer to review the record of the request to ensure the record is complete and error-free. Accordingly, the agent may send a text message or email to the multi-modal SmartPhone with a link to the address where the record is stored, and a unique access number for the record. Afterwards, the party may visit the website at the link, authenticate using the unique access number and any other forms of information requested, and review and update the record as appropriate.

In another embodiment, the record is provided and updated via an interactive voice response system. In this embodiment, the user calls a telephone number and inputs the unique access number to review an audio of the record. The user inputs a dual-tone multi-frequency (DTMF) code to indicate that revisions to the record are requested, and then selects from predetermined choices to change the record of the first component of the service and thereby change the request that was recorded as the first component of the service.

Figure 5:
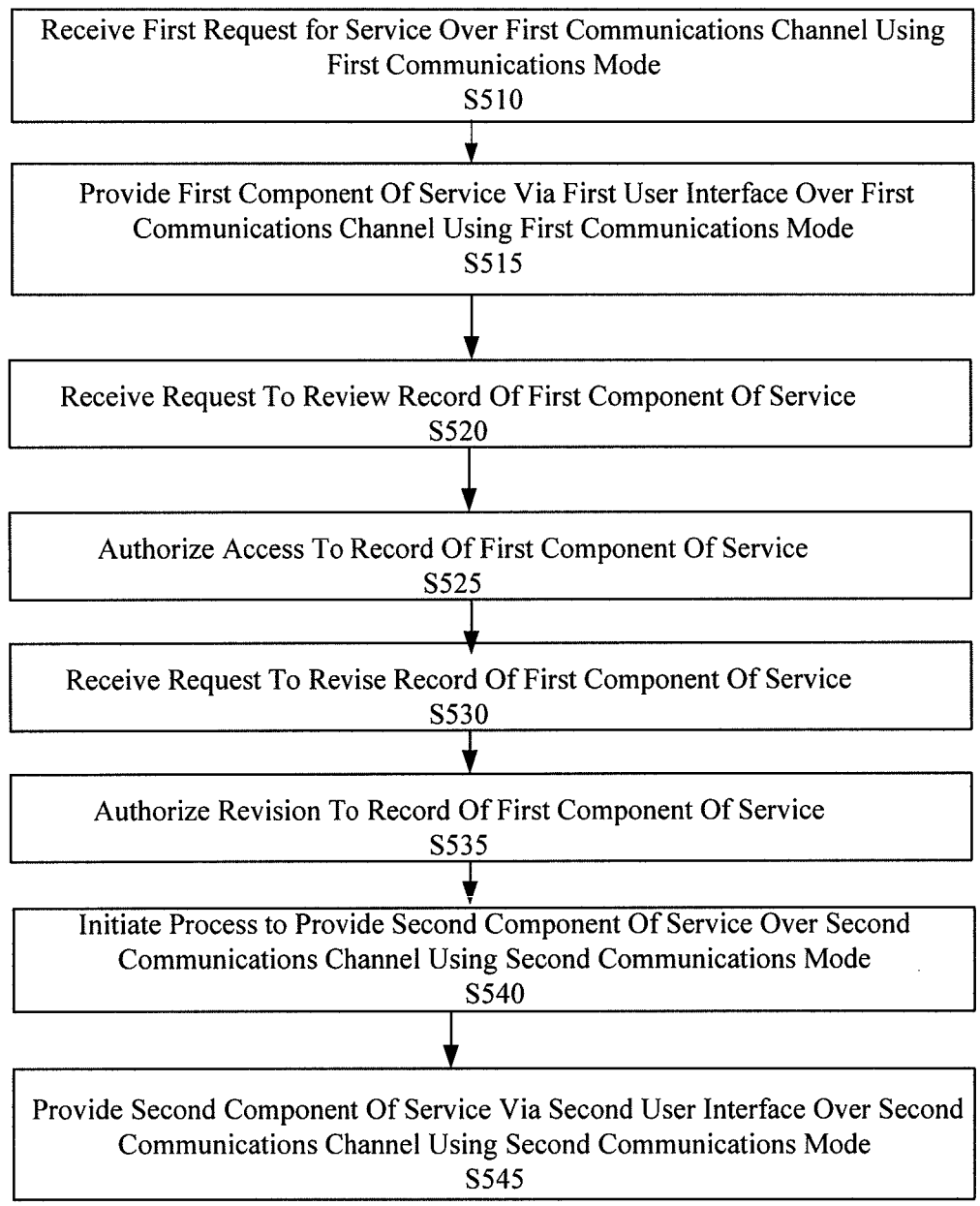
FIG. 5 shows another exemplary process for accessible and updateable service records, according to an aspect of the present disclosure.

FIG. 5 shows another exemplary process for accessible and updateable service records, according to an aspect of the present disclosure. In FIG. 5, a first request for service is received over a first communications channel using a first communications mode at S510. At S515, a first component of a service is provided via a first user interface over a first communications channel using the first communications mode. At S520, a request to review the record of the first component of the service is received. At S525, access to the record of the first component of service is authorized. At S530, a request to revise the record of the first component of the service is received, and at S535 authorization is provided to revise the record of the first component of the service. At S540, the process to provide the second component of a service is initiated over a second communications channel using a second communications mode. At S545, the second component of the service is provided via a second user interface over a second communications channel using a second communications mode.

An example of the embodiment in FIG. 5 is a telephone order for content such as entertainment to be delivered over the internet or over a closed cable network at a future date. When the requester of the content wishes to verify the order, the requester contacts an address and provides a unique access number for the report to access and update the report. For example, a cable television subscriber may use a telephone to order content for future delivery, and then use a computer to review and update the order so that the content is delivered in accordance with the updated order.

FIG. 6 shows an exemplary update for accessible and updateable service records, according to an aspect of the present disclosure. In FIG. 6, a citizen initially reports a broken street light and is provided report identification number 594837. The updated record shows the citizen reports that street lights are not turned on though darkness has fallen, along with a notation that the record is updated.

FIG. 7 shows an exemplary update for accessible and updateable service records, according to an aspect of the present disclosure. In FIG. 7, a customer requests expanded basic service and is provided report identification number 605948. The updated record shows the customer has requested advanced service, along with a notation that the record is updated.

FIG. 8 shows an exemplary update for accessible and updateable service records, according to an aspect of the present disclosure. In FIG. 8, a check box for report number 716059 shows that a party has requested to open a savings account out of four different options including opening a checking account, an IRA account and an investment account. The updated record shows the party has requested to open a checking account and not the savings account shown originally.

FIG. 9 shows an exemplary update for accessible and updateable service records, according to an aspect of the present disclosure. In FIG. 9, a check box for report number 827160 shows that a party has requested option 2. The updated record shows the party has selected option 1 and not option 2 as shown originally.

A first component of a service as described herein may be the component for which a record is initially generated. The first component may involve an initial report, complaint, service order, product purchase, service request or other aspect that is properly considered a "service" provided over a communications network. The second component may then be the follow-up to the initial report, complaint, service order, product purchase, service request or other aspect. Examples of the second component include the actual provision of a service or product, such as delivery of content over the internet.

As described in the present disclosure, a method for updating communications service records includes providing a first record of a first component of a service from a memory to a requester of the first component of the service. The method also includes editing, using a processor of a computer, the first record of the first component of the service in the memory in accordance with a request from the requester of the first component of the service. The method also includes providing a second component of the service in accordance with the edited first record of the first component of the service in the memory.

According to another aspect of the present disclosure, the first component of the service and the second component of the service are provided in different sessions.

According to yet another aspect of the present disclosure, the first component of the service is provided via a first user interface and the second component of the service is provided via a second user interface.

According to still another aspect of the present disclosure, the first component of the service is provided over a first communications channel and the second component of the service is provided over a second communications channel.

According to another aspect of the present disclosure, the first component of the service is provided using a first communications mode and the second component of the service is provided using a second communications mode.

According to yet another aspect of the present disclosure, the memory and computer are elements of a cloud computing network.

According to still another aspect of the present disclosure, the first record of the first component of the service is a dialog. The dialog is edited in accordance with the request from the requester of the first component of the service.

According to another aspect of the present disclosure, the second record of the second component of the service is stored in the memory as an update to the dialog.

According to yet another aspect of the present disclosure, the first component and second component are implemented using different communications standards.

According to still another aspect of the present disclosure, the method also includes confirming a unique identification of the first record prior to allowing an edit to the first record.

According to another aspect of the present disclosure, the method includes providing the unique identification of the first record to the requester during the first component of the service.

According to yet another aspect of the present disclosure, the method includes confirming an identity of a party requesting the editing as the requester of the first component of the service.

According to still another aspect of the present disclosure, the identity of the party requesting the editing is confirmed as the requester using a password and unique username.

According to another aspect of the present disclosure, the first record is generated and maintained by a provider of the first component of the service and the second component of the service.

According to yet another aspect of the present disclosure, the first component of the service is provided to the requester of the service in accordance with a dialog.

According to still another aspect of the present disclosure, the second component of the service is provided to the requester in accordance with the dialog.

According to another aspect of the present disclosure, the service is a customer service provided by a communications service provider.

According to yet another aspect of the present disclosure, the first component of the service and the second component of the service are provided contiguously, and the first record of the first component of the service is provided after the second component of the service starts.

According to an aspect of the present disclosure, at least one non-transitory computer readable medium stores a set of executable instructions for updating communications service records. The executable instructions, when executed by a processor, cause at least one computer to provide a first record of a first component of a service from a memory to a requester of the first component of the service. The executable instructions cause the at least one computer to edit the first record of the first component of the service in the memory in accordance with a request from the requester of the first component of the service. The executable instructions also cause the at least one computer to provide a second component of the service in accordance with the edited first record of the first component of the service in the memory.

According to an aspect of the present disclosure, at least one computer platform executes executable instructions for updating communications service records. The at least one computer platform includes a memory and a processor. The processor executes the executable instructions, and the instructions, when executed, cause the at least one computer platform to provide a first record of a first component of a service from a memory to a requester of the first component of the service. The instructions also cause the at least one computer to edit the first record of the first component of the service in the memory in accordance with a request from the requester of the first component of the service. The instructions also cause the at least one computer to provide a second component of the service in accordance with the edited first record of the first component of the service in the memory.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for updating communications service records, comprising:
   providing, after a first component of a service has been provided, a first record of the first component of the service from a memory to a requester who originated a request for the first component of the service and who is a recipient of the first component of the service;
   accepting, from the requester and using a processor of a computer, electronic edits to the first record of the first component of the service input by the requester independent of a provider of the service to update the first record; and
   providing a second component of the service to the requester in accordance with the edited first record of the first component of the service in the memory,
   wherein the method uses multi-modal communications permitting the requester to access and edit the first component of the service stored in the memory, independent of the provider of the service, by the requester selectively using a different communication mode than the communication mode that the first component of the service was provided,
   wherein the multi-modal communications include a computer communication mode, a smartphone communication mode, an electronic tablet communication mode, a Voice over Internet Protocol communication mode, and a telephone communication mode,
   wherein a type of information transmitted includes voice, text, and graphics, and
   wherein the requester transitions between communication modes while accessing and editing the first component.

2. The method of claim 1,
   wherein the first component of the service and the second component of the service are provided in different sessions.

3. The method of claim 1,
   wherein the first component of the service is provided via a first user interface and the second component of the service is provided via a second user interface.

4. The method of claim 1,
   wherein the first component of the service is provided over a first communications channel and the second component of the service is provided over a second communications channel.

5. The method of claim 1,
   wherein the memory and computer are elements of a cloud computing network.

6. The method of claim 1,
   wherein the first record of the first component of the service is a dialog, and
   wherein the dialog is edited in accordance with the service input from the requester of the first component of the service.

7. The method of claim 6, further comprising:
   storing a second record of the second component of the service in the memory as an update to the dialog.

8. The method of claim 1,
   wherein the first component and second component are implemented using different communications standards.

9. The method according to claim 1, further comprising:
   confirming a unique identification of the first record prior to allowing an edit to the first record.

10. The method according to claim 9, further comprising:
    providing the unique identification of the first record to the requester during the first component of the service.

11. The method according to claim 1, further comprising:
    confirming an identity of a party inputting the edits as the requester of the first component of the service.

12. The method according to claim 1,
    wherein the identity of the party inputting the edits is confirmed as the requester using a password and unique username.

13. The method according to claim 1,
    wherein the first record is generated and maintained by a provider of the first component of the service and the second component of the service.

14. The method according to claim 1,
    wherein the first component of the service is provided to the requester of the service in accordance with a dialog.

15. The method according to claim 14,
    wherein the second component of the service is provided to the requester in accordance with the dialog.

16. The method according to claim 1,
    wherein the service is a customer service provided by a communications service provider.

17. The method according to claim 1,
    wherein the first component of the service and the second component of the service are provided contiguously, and the first record of the first component of the service is provided after the second component of the service starts.

18. A non-transitory computer readable medium that stores a set of executable instructions for updating communications service records, the executable instructions, when executed by a processor, causing a computer to:

provide, after a first component of a service has been provided, a first record of the first component of the service from a memory to a requester who originated a request for the first component of the service and who is a recipient of the first component of the service;

accept, from the requester, electronic edits to the first record of the first component of the service input by the requester independent of a provider of the service to update the first record; and provide a second component of the service to the requester in accordance with the edited first record of the first component of the service in the memory, wherein the executable instructions facilitate multi-modal communications permitting the requester to access and edit the first component of the service stored in the memory, independent of the provider of the service, by the requester selectively using a different communication mode than the communication mode that the first component of the service was provided, wherein the multi-modal communications include a computer communication mode, a smartphone communication mode, an electronic tablet communication mode, a Voice over Internet Protocol communication mode, and a telephone communication mode, wherein a type of information transmitted includes voice, text, and graphics, and wherein the requester transitions between communication modes while accessing and editing the first component.

19. A computer platform that executes executable instructions for updating communications service records, the computer platform comprising:

memory; and a processor, wherein the processor executes the executable instructions, and the instructions, when executed, cause the computer platform to:

provide, after a first component of a service has been provided, a first record of the first component of the service from a memory to a requester who originated a request for the first component of the service and who is a recipient of the first component of the service;

accept, from the requester, electronic edits to the first record of the first component of the service input by the requester independent of a provider of the service to update the first record; and provide a second component of the service to the requester in accordance with the edited first record of the first component of the service in the memory, wherein the executable instructions facilitate multi-modal communications permitting the requester to access and edit the first component of the service stored in the memory, independent of the provider of the service, by the requester selectively using a different communication mode than the communication mode that the first component of the service was provided, wherein the multi-modal communications include a computer communication mode, a smartphone communication mode, an electronic tablet communication mode, a Voice over Internet Protocol communication mode, and a telephone communication mode, wherein a type of information transmitted includes voice, text, and graphics, and wherein the requester transitions between communication modes while accessing and editing the first component.

* * * * *